Nov. 13, 1956 — R. E. J. NORDQUIST — 2,770,349
CONVEYOR MECHANISM FOR DIVIDING SINGLE LINE
OF ARTICLES INTO DOUBLE LINE
Filed March 21, 1952 — 3 Sheets-Sheet 3
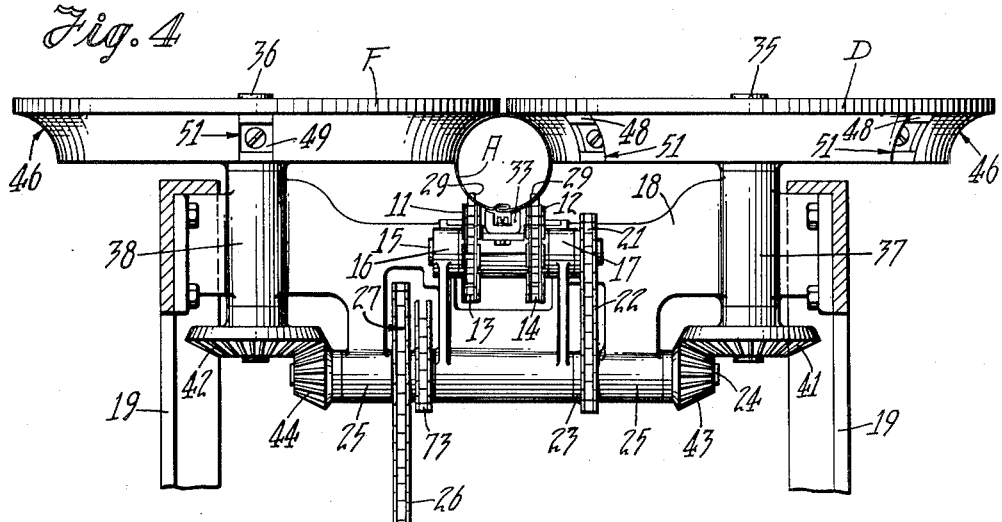
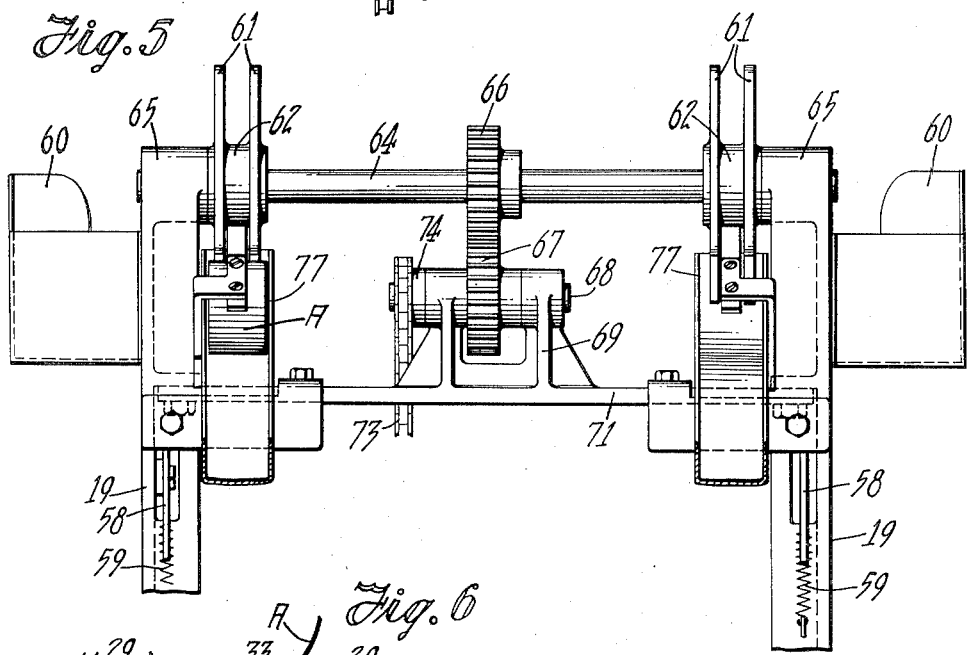
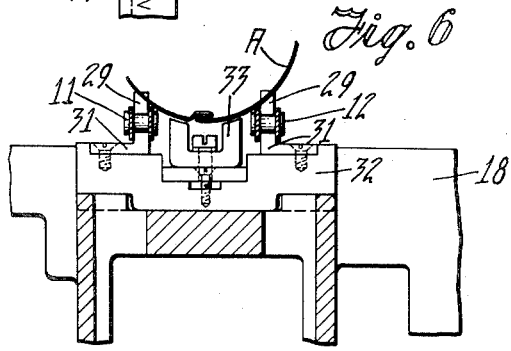
INVENTOR.
RONALD E. J. NORDQUIST
BY Charles H. Erne
Leland R. McCann
George W. Reiber
ATTORNEYS

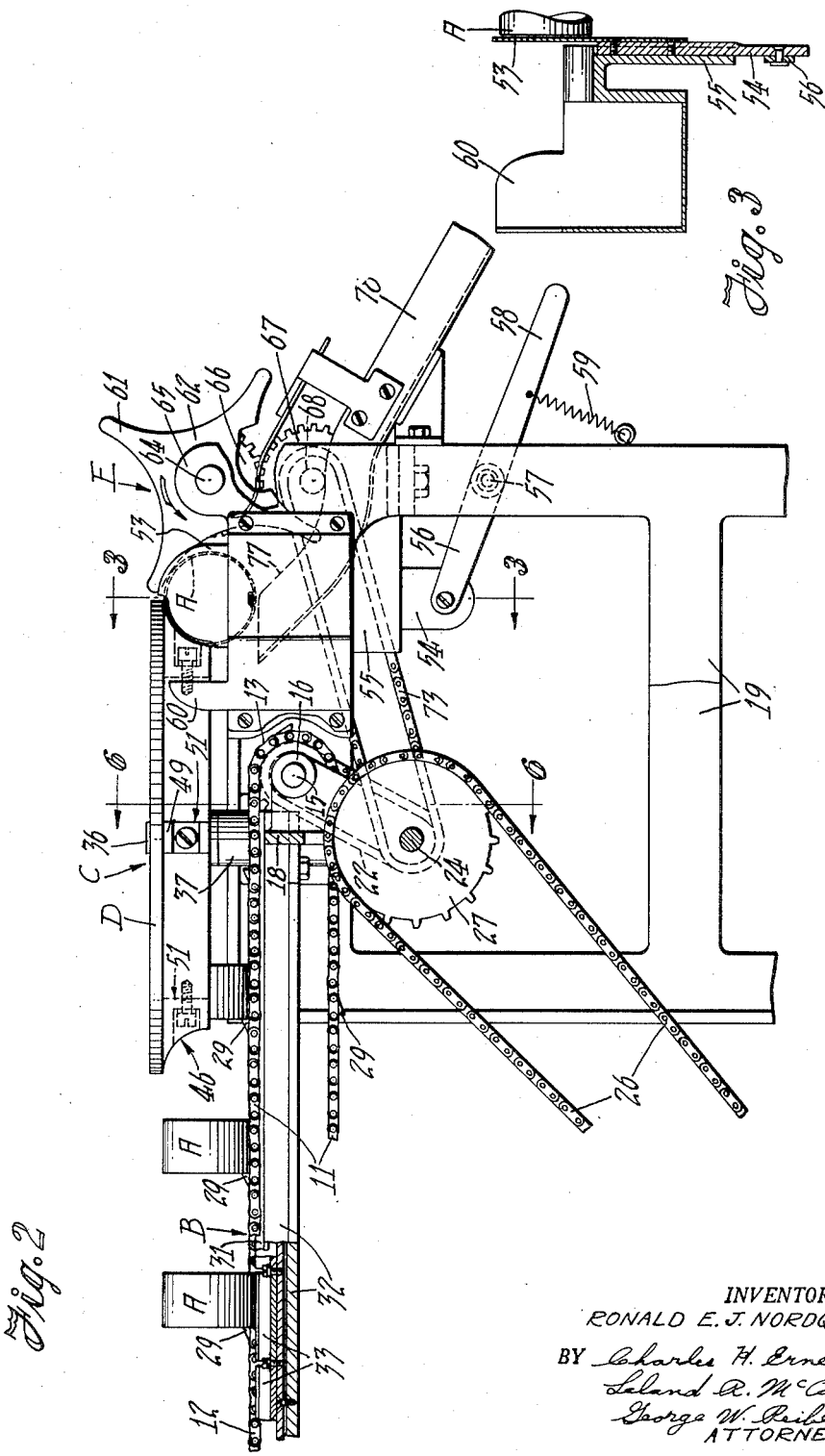

United States Patent Office 2,770,349
Patented Nov. 13, 1956

2,770,349

CONVEYOR MECHANISM FOR DIVIDING SINGLE LINE OF ARTICLES INTO DOUBLE LINE

Ronald E. J. Nordquist, Maplewood, N. J., assignor to American Can Company, New York, N. Y., a corporation of New Jersey Application March 21, 1952, Serial No. 277,798

7 Claims. (Cl. 198—31)

The present invention relates to a mechanism for conveying articles, such as can bodies or cans, along a predetermined path of travel and has particular reference to devices for dividing a single line of traveling articles into a double line to effect advantages of separate subsequent treatment of the articles.

An object of the invention is the provision in a can body feeding and conveying mechanism of devices for dividing a single line of spaced and timed bodies into a double line wherein alternate can bodies in the single line are picked up and carried to an offset line of bodies and the remaining or in-between bodies in the single line are picked up and carried to a second offset line while maintaining full control over the travel of the bodies and their timed relation.

Another object is the provision of such a feeding mechanism wherein the line of can bodies is divided equally by divider wheels shaped to receive the can bodies and carrying spaced magnets for gripping the bodies and for delivering them into registry with auxiliary feeding devices.

Another object is the provision of such a feeding mechanism wherein a predetermined positioning of the can bodies on the divider wheels and a predetermined positioning of the bodies at the points of transfer may be obtained to insure accuracy in the timing and the transfer of the can bodies for subsequent treatment thereof.

Numerous other objects and advantages of the invention will be apparent as it is better understood from the following description, which, taken in connection with the accompanying drawings, discloses a preferred embodiment thereof.

Referring to the drawings:

Fig. 2 is a side elevation of the mechanism shown in Fig. 1, with parts broken away and parts in section;

Fig. 3 is a fragmentary sectional view taken substantially along the line 3—3 in Fig. 2;

Fig. 4 is a sectional view taken substantially along the line 4—4 in Fig. 1, with parts broken away;

Fig. 5 is a front elevation as viewed from the right in Fig. 1; and

Fig. 6 is a fragmentary sectional view taken substantially along the line 6—6 in Fig. 2.

Figure 1:
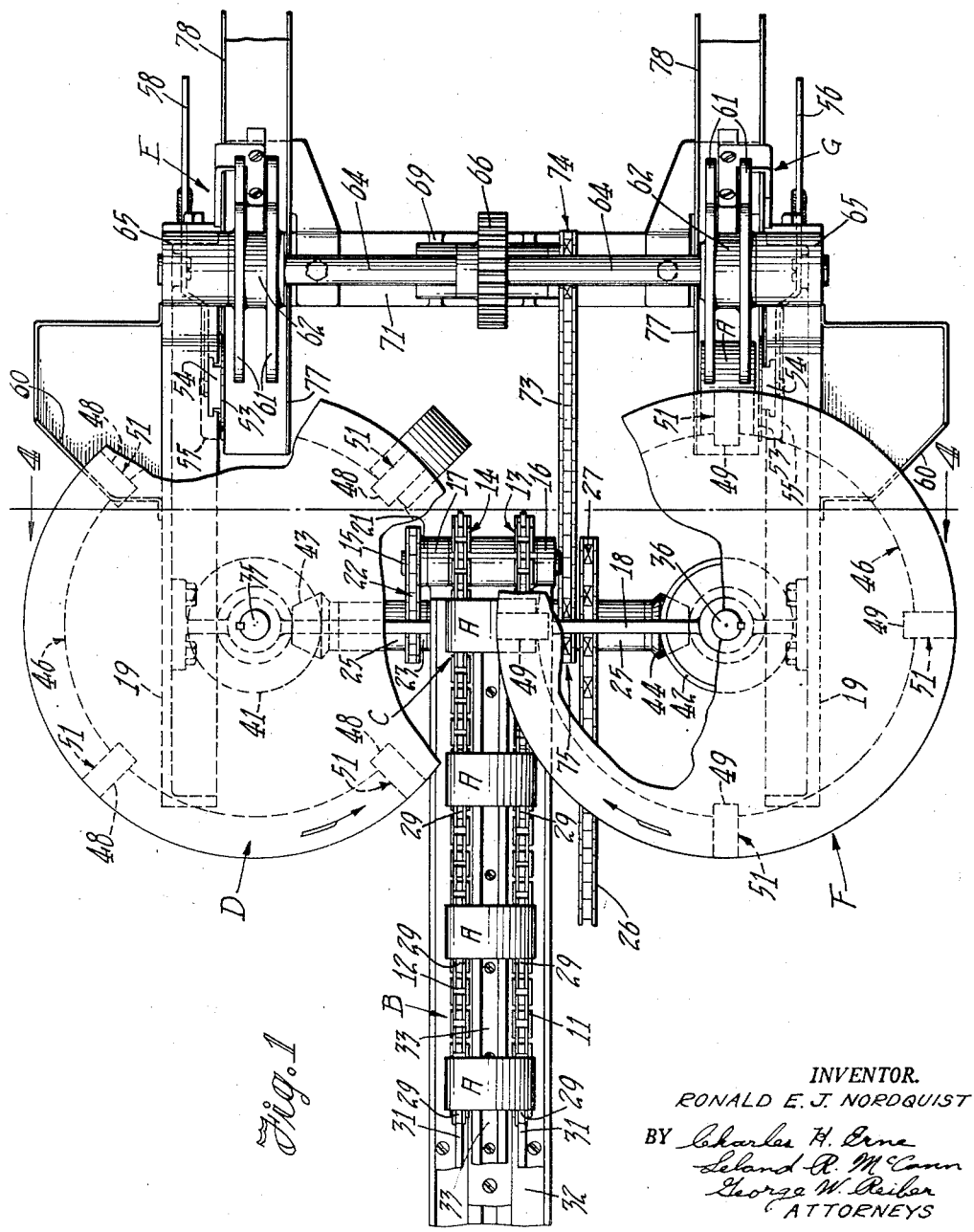
Figure 1 is a top plan view of a feeding mechanism embodying the instant invention with parts broken away.

As a preferred or exemplary embodiment of the instant invention the drawings illustrate a feeding mechanism for advancing and dividing a single line of spaced and timed tubular and cylindrical sheet metal can bodies A into two offset lines for further advancement. In the single line, the bodies are disposed in a horizontal, end-to-end, spaced and timed relation and are supported on an entrance conveyor B (Figs. 1 and 2) which terminates at a dividing station C. At the dividing station C, alternate can bodies A are picked off the conveyor B by a rotating divider wheel D disposed adjacent one side of the conveyor. This divider wheel D holds the picked off can bodies in timed and spaced relation and delivers them in such relation and in a predetermined position at a transfer point to an auxiliary conveyor E which preferably is part of a more elaborate machine for receiving the bodies in timed and spaced relation for the performance of subsequent operations thereupon.

In a similar manner, the other or in-between can bodies A on the conveyor B are picked off by a rotating divider wheel F disposed on the opposite side of the conveyor. This divider wheel F holds the picked off can bodies in their timed and spaced relation and delivers them in such relation and in a predetermined position at a transfer point to an auxiliary conveyor G which like the auxiliary conveyor E preferably is part of a more elaborate machine for receiving the bodies in timed and spaced relation for the performance of subsequent operations thereupon.

In this manner the can bodies A entering the mechanism in a single line are divided into two separate spaced lines and are fed to two separate auxiliary conveyors or machines while maintaining the bodies under full control and in timed relation. With such control over the bodies they can be accurately delivered to the auxiliary conveyors.

The entrance conveyor B which supports the can bodies A and which advances them into the dividing station C preferably comprises a pair of spaced and parallel endless feed chains or elements 11, 12 (Figs. 1, 2, 4 and 6) which are disposed in a horizontal position. These chains operate over a pair of spaced actuating sprockets 13, 14 secured to a horizontal transverse conveyor shaft 15 journaled in a pair of spaced bearings 16, 17, formed on a transverse bracket 18, the ends of which are bolted to and connect a pair of upright frames 19 which constitute the main frame of the mechanism.

The conveyor shaft 15 is continuously rotated by a sprocket 21 which is secured to an outer end of the shaft. The sprocket is rotated by an endless chain 22 which is driven by a sprocket 23 carried on and secured to a main driving shaft 24 (Figs. 2 and 4) journaled in a pair of spaced bearings 25 formed on the transverse bracket 18. The driving shaft 24 is rotated in any suitable manner, preferably by an endless chain 26 which operates over a sprocket 27 secured to the shaft.

The can bodies A supported on the conveyor B, rest on top of and between the two spaced chains 11, 12 as best shown in Figs. 1, 2, 4 and 6 and are advanced while being maintained in spaced and timed order by feed dogs 29 which are secured to the chains at predetermined spaced intervals therealong. Along the upper runs of the conveyor, the chains 11, 12 ride on supporting guide rails 31 which are secured to a longitudinal bed 32 the machine end of which rests on and is fastened to the transverse bracket 18. Intermediate the guide rails 31, the bed 32 carries a plurality of bar magnets 33 which preferably are permanent magnets but which may be electro-magnets if desired. These magnets 33 are arranged in a straight line just below the path of travel of the can bodies A on the conveyor chains 11, 12 and attract but do not touch the bodies. The fields of these magnets act as a drag on the bodies and thus keep the bodies in proper engagement with the chains and the feed dogs 29 to insure accuracy in spacing and position of the advancing bodies as they enter the dividing station C.

The divider wheels D and F, located one on each side of the conveyor B, at the divider station C, are rotated in unison in time with the advancement of the conveyor B and in the direction indicated by the arrows shown in Fig. 1. For this purpose the divider wheels are mounted respectively on continuously rotating vertically disposed drive shafts 35, 36 which are journaled in bearings 37, 38 (Fig. 4) formed on the transverse bracket 18. The shafts 35, 36 are rotated in opposite directions by bevel gears 41, 42 which are secured to the lower ends of the shafts and which mesh with bevel driving pinions 43, 44 attached to the outer ends of the main driving shaft 24.

These divider wheels D and F, preferably are substantially flat discs disposed opposite each other in horizontal or edge to edge alignment as best shown in Fig. 4 for simultaneous engagement with opposite sides of an advancing can body adjacent the upper half of the body. For this purpose the peripheral edge of each disc is formed with a curved can body contacting face 46 which extends completely around each disc and is curved in a direction transversely of the disc edge, in the instant case in a vertical direction, and is shaped to conform to an upper quadrant of the can body. Hence when a can body A is advanced into the divider station C, it moves into position between the cooperating edges or curved faces 46 of the two divider wheels D, F and is slightly compressed to insure the picking up of the can body by one of the wheels. This picking up operation is effected by a plurality of magnets 48 (Figs. 1 and 4) carried in the divider wheel D and similar magnets 49 carried in the wheel F. These magnets preferably are permanent magnets although electro-magnets may be used if desired.

The magnets 48, 49 are located in recesses 51 formed in the curved can body contacting faces 46 of the divider wheels and are distributed around the periphery of the wheels in an alternately spaced or staggered relation so that the magnets of one wheel will pick up alternate can bodies A entering the divider station C while the magnets of the opposing wheel will pick up the other or in-between can bodies entering the station. The drawings show each wheel as having four such magnets arranged substantially 90 degrees apart with the magnets of one wheel arranged intermediate the magnets of the other wheel, i. e. at substantially 45 degree relationship.

Hence, as best shown in Fig. 1, a magnet 49 of the divider wheel F aligns with and attracts a can body A at the station C, while a magnet 48 on the divider wheel D is rotating toward the divider station in time with the next can body in line on the conveyor B to pick up this body when the body and the magnet 48 arrive simultaneously at the station. This proper timing is brought about through the timed relationship of the peripheral speed of rotation of the divider wheels D, F and the lineal speed of the conveyor B.

It should be noted that when a magnet of one wheel is aligned with a can body at the divider station C, the magnets of the opposite wheel are out of alignment with the divider station and hence merely the curved face of this opposite wheel is contacting the body. This contact however serves a useful purpose in that it presses the can body toward the aligned magnet in the opposite wheel and thereby positions the can body against the magnet in a predetermined relation to the wheel for accurate subsequent advancement.

With a can body A thus pressed by the divider wheel D into firm and properly located engagement with the magnet 49 of the divider wheel F (as shown in Figs. 1 and 4), the continued rotation of the wheels causes the can body clinging to the magnet 49 to be removed from the conveyor B and carried along a curved path of travel, in spaced and timed relation to the other bodies and in a predetermined position, through an arc of substantially 90 degrees to the point of transfer to the auxiliary conveyor G hereinbefore mentioned.

In a similar manner, the next can body in line when it reaches the dividing station C is pressed by the divider wheel F into firm and properly located engagement with an aligned magnet 48 of the divider wheel D and the continued rotation of the wheels causes this can body as it clings to the magnet 48, to be removed from the conveyor B and carried along a curved path of travel, in spaced and timed relation to the other bodies and in a predetermined position, through an arc of substantially 90 degrees to the point of transfer to the auxiliary conveyor E hereinbefore mentioned.

In this manner, the single line of spaced and timed can bodies A entering the machine on the conveyor B is divided into two separate lines in which the can bodies are still maintained in spaced and timed relation.

At the transfer points to the auxiliary conveyors E and G, the can bodies, still in a horizontal position, are stripped off the magnets 48, 49 of the divider wheels D, F, and are thereby released from the wheels. This stripping action is effected preferably by stationary stripping elements or plates 53 (Figs. 1, 2 and 3) which are disposed adjacent the curved contacting faces 46 of the divider wheels, D, F in radial relation to the wheels and in the path of travel of the bodies clinging to the wheels for endwise engagement of the bodies with the plates.

Each plate 53 is secured to a vertical slide 54 carried in vertical slideway gibs 55 secured to the machine side frames 19. At its lower end the slide is pivotally mounted on a lever 56 (Fig. 2) carried on a pivot pin 57 secured in the machine frame. Beyond the pivot pin, the lever is formed as a handle 58 for manually manipulating the slide 54. A tension spring 59 having one end secured to the handle 58 and its opposite end secured to the adjacent side frame 19, keeps the slide 54 in a raised position so that the stripping plate 53 will be in the path of travel of the can bodies on the divider wheel.

By raising the handle 58, the stripping plate 53 may be depressed out of the path of travel of the can bodies on the divider wheel to permit a can body to pass beyond the transfer points to the auxiliary conveyors and engage against an auxiliary stripper plate 60 extending into the path of travel of the can body. The auxiliary stripper plate 60 is formed as an extended side wall of a box attached to the side of the main frame 19. There is one of these boxes for each divider wheel D, F and a can body stripped off by the auxiliary stripper plate 60 falls into the box from which it may be removed manually for inspection purposes.

Under normal operation of the mechanism, when the stripping plates 53 are in their raised positions in the path of travel of the can bodies, the leading end of a can body on a divider wheel D, F engages against the stripping plate 53 and thereby has its travel with the divider wheel arrested. As the divider wheel continues to rotate, it advances its magnet 48, 49 beyond the can body and thereby releases the body from the wheel.

During this stripping operation, the can body is engaged by prongs 61 (Figs. 1, 2 and 5) of a star wheel 62 disposed adjacent and forming a part of each of the auxiliary conveyors E, G for receiving the can body and for further advancing it while maintaining the body in its spaced and timed relation. There are two of these star wheels 62, one for each auxiliary conveyor. Each star wheel comprises a pair of spaced and parallel discs disposed in a vertical position and having their prongs 61 extending therefrom in transverse alignment so that the prongs in pairs engage against the side of the can body.

The star wheels 62 are rotated in time with the divider wheels D, F. For this purpose they are mounted on a horizontal transverse actuating shaft 64 the ends of which are journaled in bearings 65 formed in the machine frame 19. The shaft 64 is rotated continuously, in the direction indicated by the arrow in Fig. 2, by a spur gear 66 which is mounted on the shaft. The gear meshes with and is driven by a spur gear 67 mounted on a short gear shaft 68 having its ends journaled in a bearing bracket 69 formed as an integral part of a cross beam 71 extending across the machine frame and having its ends secured to the frame.

The gear shaft 68 is rotated by an endless chain 73 (Figs. 1, 2 and 5) which operates over a sprocket 74 secured to the gear shaft and over a sprocket 75 (Fig. 1) secured to the main drive shaft 24. Thus through this connection with the main drive, the star wheels 62 are rotated in time with the other parts of the mechanism.

When a pair of the prongs 61 of a star wheel 62 engages against a can body A as mentioned above, they press downwardly on the can body and thereby strip it away from the magnet 48 or 49 on the divider wheel D or F simultaneously with the stripping of the body in an endwise direction by the stripping plates 53. The prongs 61 remain in contact with the body during this stripping action and upon release of the body push it downwardly into a guide chute 77, maintaining the spacing and timing of the body relative to the other bodies passing through the mechanism.

While the can body is under control of a star wheel 62 it may be advanced by the wheel into other turrets or wheels for further advancement in spaced and timed order or it may be permitted to roll down an inclined extension 78 of the guide chute 77. In the instant case the bodies are permitted to roll along the chute extension 78 which leads to an elevator or the like mechanism for receiving the bodies in spaced and timed order and for further advancing them in such order.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a conveying mechanism for magnetizable can bodies and other articles, the combination of a conveyor for advancing can bodies along a predetermined path of travel in spaced and timed order, a pair of oppositely disposed divider wheels located one on each side of said conveyor in the path of travel of said can bodies and between which said bodies pass, said divider wheels carrying peripherally located magnets arranged in alternately spaced relation, means for rotating said divider wheels in unison and in time with said conveyor for rotating said magnets individually into engagement with can bodies advanced into position between said wheels for removing said can bodies alternately from said conveyor in spaced and timed order for distribution of said can bodies in said spaced and timed order into two separate paths of travel, a rotatable star wheel located adjacent each of said divider wheels and having prongs engageable with the can bodies on said wheels for further advancing said bodies in said spaced and timed order, and means for rotating said star wheels in time with said divider wheels.

2. In a conveying mechanism for magnetizable can bodies and other articles, the combination of a conveyor for advancing can bodies along a predetermined path of travel in spaced and timed order, a pair of oppositely disposed divider wheels located one on each side of said conveyor in the path of travel of said can bodies and between which said bodies pass, each of said divider wheels having a peripheral face extending around it and conforming transversely to a portion of the outer contour of said can bodies for receiving and engaging said can bodies between said faces to locate each of said bodies in a predetermined position thereon, said divider wheels carrying peripherally located magnets arranged in alternately spaced relation in said faces, means for rotating said divider wheels in unison and in time with said conveyor for rotating said magnets individually into engagement with can bodies advanced into position between said wheels for removing said can bodies alternately from said conveyor in spaced and timed order for distribution of said can bodies in said spaced and timed order into two separate paths of travel, a stripper plate disposed adjacent each of said divider wheels in the path of travel of the can bodies on said wheels, and prongs movable transversely across said peripheral faces of the wheels adjacent said stripper plates for cooperating with said plates to release the can bodies from the wheels and for further advancing them in said spaced and timed order.

3. In a conveying mechanism for magnetizable can bodies and other articles, the combination of a conveyor for advancing can bodies along a predetermined path of travel in spaced and timed order, a rotatable divider wheel located adjacent the path of travel of said can bodies on said conveyor, said divider wheel carrying a plurality of spaced magnets for picking up can bodies from said conveyor for further advancement in spaced and timed order, means for rotating said divider wheel in time with said conveyor, movable stripper means disposed adjacent said divider wheel in the path of travel of the can bodies on said wheel for releasing said can bodies from said magnets at a transfer point, and means for moving said stripper means out of the path of travel of said can bodies to permit a can body to pass beyond said transfer point for subsequent release from said divider wheel.

4. In a conveying mechanism for magnetizable can bodies and other articles, the combination of a conveyor for advancing can bodies along a predetermined path of travel in spaced and timed order, a rotatable divider wheel located adjacent the path of travel of said can bodies on said conveyor, said divider wheel carrying a plurality of spaced magnets for picking up can bodies from said conveyor for further advancing in spaced and timed order, means for rotating said divider wheel in time with said conveyor, movable stripper means disposed adjacent said divider wheel in the path of travel of the can bodies on said wheel for releasing said can bodies from said magnets at a transfer point, means for moving said stripper means out of the path of travel of said can bodies to permit a can body to pass beyond said transfer point for subsequent release from said divider wheel, auxiliary stripper means disposed adjacent said divider wheel in the path of travel of the can bodies on said wheel and beyond said movable stripper means for releasing from said wheel can bodies carried beyond said movable stripper means, and means adjacent said auxiliary stripper means for receiving a can body released by said auxiliary stripper means.

5. In a conveying mechanism for magnetizable cylindrical can bodies and other cylindrical articles, the combination of a conveyor for advancing can bodies in end to end alignment along a predetermined path of travel, a pair of oppositely disposed rotatable divider wheels located adjacent the path of travel of the uppermost portions of said can bodies, the outer peripheral edge of each of said wheels being curved transversely thereof to conform to and press against an upper quadrant of a cylindrical can body on said conveyor, magnets carried in alternately spaced relation on said curved peripheral edges of the wheels for attracting and holding each can body in a predetermined position against the curved peripheral edge of a said wheel, and means for rotating said wheels in timed relation with said conveyor for rotating said magnets individually into engagement with can bodies advanced into position between said wheels for removing said can bodies alternately to opposite sides of the conveyor.

6. The mechanism of claim 5 wherein means are provided adjacent the periphery of each divider wheel for moving said can bodies downwardly to strip them from said wheels.

7. In a conveying mechanism for magnetizable tubular can bodies and other articles, the combination of a conveyor for advancing said can bodies in end to end alignment along a predetermined path of travel with their axes disposed in a substantially straight line, a pair of oppositely disposed rotatable divider wheels located adjacent said path of travel and mounted on axes disposed in a plane extending at substantially right angles to said path of travel, said divider wheels carrying peripherally located magnets arranged in alternately spaced relation, means for rotating said divider wheels in unison and in time with said conveyor for rotating said magnets individually into engagement with can bodies advanced into position between said wheels for removing said can bodies alternately from said conveyor in spaced and timed order into two separate paths of travel, and means disposed adjacent the periphery of each divider wheel for moving said can bodies in a direction substantially axially of said divider wheels to strip said bodies from said wheels.

References Cited in the file of this patent
UNITED STATES PATENTS

| | | |
|---|---|---|
| 1,168,281 | Buch | Jan. 18, 1916 |
| 2,264,348 | Weygant | Dec. 2, 1941 |
| 2,629,482 | Back | Feb. 24, 1953 |
| 2,630,903 | Currivan | Mar. 10, 1953 |